No. 688,749. Patented Dec. 10, 1901.
E. A. SPERRY.
STORAGE BATTERY TRAY OR CASE.
(Application filed Nov. 6, 1899.)
(No Model.)
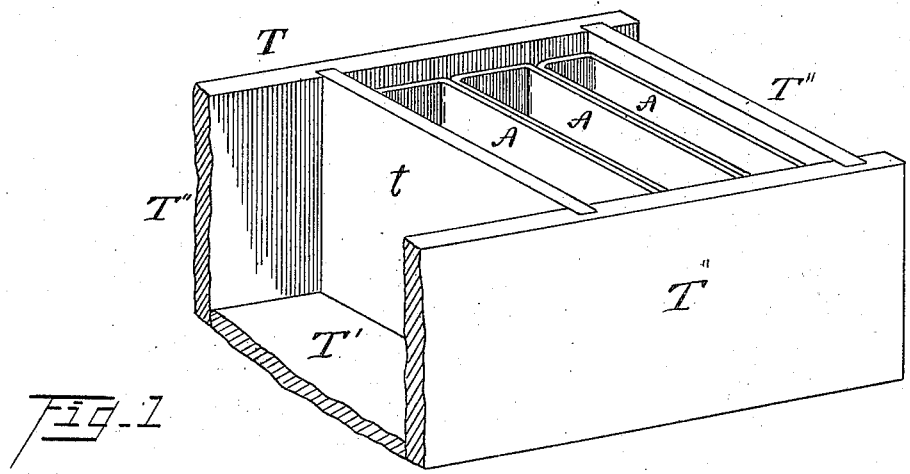
Fig. 1.
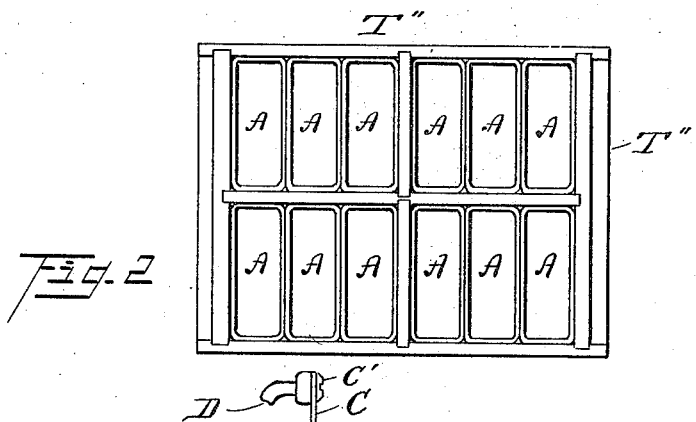
Fig. 2.
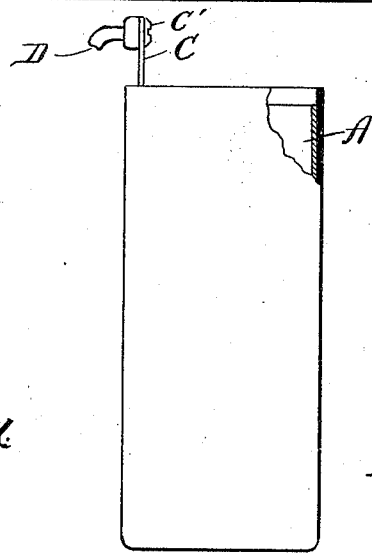
Fig. 3.
Witnesses:
Inventor.
Elmer A. Sperry,
by Buckingham & Ewart
attys.

UNITED STATES PATENT OFFICE.

ELMER A. SPERRY, OF CLEVELAND, OHIO, ASSIGNOR, BY MESNE ASSIGNMENTS, TO NATIONAL BATTERY COMPANY, A CORPORATION OF NEW JERSEY.

STORAGE-BATTERY TRAY OR CASE.

SPECIFICATION forming part of Letters Patent No. 688,749, dated December 10, 1901.

Original application filed September 13, 1899, Serial No. 730,320. Divided and this application filed November 6, 1899. Serial No. 735,968. (No model.)

*To all whom it may concern:*

Be it known that I, ELMER A. SPERRY, a citizen of the United States residing at Cleveland, in the county of Cuyahoga and State of Ohio, have invented new and useful Improvements in Storage-Battery Trays or Cases, of which the following is a specification.

My invention relates to storage-battery trays and cases; and it consists in various details of construction of both the cells and the method of supporting same.

It has for its objects to cheapen the manufacture of storage batteries and provide means whereby batteries of a peculiar construction may be rendered practicable by receiving suitable support and by being suitably mounted, the grouping and mounting of the batteries having special reference to their use in vehicles.

This application constitutes a division of application for Letters Patent, Serial No. 730,320, "Electric batteries and mounting same," filed September 13, 1899.

These objects are attained by devices illustrated in accompanying drawings, in which—

Figure 1 illustrates one construction of tray or cell containing box. Fig. 2 is an alternate form. Fig. 3 illustrates one of the cells.

Similar letters of reference indicate like parts throughout the several views.

This invention relates to the support and grouping of batteries constructed with a metal retaining-case for the electrolyte. This metal is preferably lead or alloy rich in lead, which is more or less brittle, the walls being thin on account of the weight and for practical purposes required to receive support and stiffening, as will readily be understood. After the cells of this general character are completed they are wrapped or otherwise protected with suitable insulating material—such, for instance, as acid-proof insulating felt, fiber, or gum—being thoroughly insulated, as shown at A, Fig. 3, the insulation preferably protruding slightly above the metallic case to more thoroughly insulate and protect same. Above the wrapping protrudes the portion of the case C or a conductor connecting with the electrodes which connects by screw $C'$ or equivalent with the adjacent cells or suitable conductor D. It is to further stiffen and render practical a cell made of extremely light walls (which, by the way, is all that is required for properly retaining the electrolyte) that the special form of tray and grouping has been resorted to, which is now to be described. It will readily be seen that owing to the fact that not only are the walls thin, but the material of which they are composed is necessarily more or less feeble and limber, that there is a special combination between such a cell and a tray built with special reference to not only carrying the batteries in groups, but to support the side walls of the thin metal cases throughout and at frequent intervals. In carrying out this part of my invention a number of structures have been developed, one of which, however, is illustrated in Figs. 1 and 2. This consists of a tray T, consisting of suitable bottom $T'$ and side walls $T''$, divided off into small compartments, illustrated, the separating-walls being illustrated by $t$. In Figs. 1 and 2 these compartments, for instance, are made large enough to contain three cells A A A. The partitions $t$ may be fastened to the other partitions or sides in any well-known manner, one of which is illustrated in Figs. 1 and 2, and the tray as a whole may consist of rectangular compartments or a cellular structure which has more than one row of compartments, as illustrated in Fig. 2. It will thus be seen that the cells are supported not only at their ends and bottom, but frequently throughout the group, by stiff sides or partitions $t$, which prevent any tendency to buckle or sink, and this device is found to effectually prevent trouble of the kind named.

It will be readily understood that while the detailed construction has been described with more or less minuteness, yet the invention should be in no wise restricted to the exact methods and details described, but rather should be limited only in scope as indicated in the claims. It will, furthermore, be readily understood that while it is designed to use the above parts in the relation shown, yet some may be used without the others, and the invention extends to such use.

Having thus described my invention, what I claim as new, and desire to secure by Letters Patent, is—

1. A battery consisting of electrically-connected cells, within individual cases having walls made up of flexible material and arranged in supporting contact with each other, in combination with a tray or receptacle for such cases, having a plurality of stiff, separating and supporting partitions, interspersed throughout the cells and in contact with the side walls of the adjacent cases, substantially as set forth.

2. A battery consisting of groups of cells having thin metal cases for the cells, in supporting contact with each other, in combination with a tray or receptacle for such cases having a plurality of stiff separating-partitions interspersed throughout the different groups of cases, and in contact with the side walls of the adjacent cases, substantially as set forth.

3. A battery consisting of electrically-connected cells, each contained in a case of thin metal, the cases being arranged in supporting contact with each other, in combination with a non-conducting tray or receptacle for such cases, having a plurality of stiff separating-partitions protruding above the cases, for increasing the insulation between them, the said partitions being interspersed throughout the cells and in contact with the side walls of the adjacent cases, substantially as set forth.

4. A battery consisting of electrically-connected cells, each having a case of thin metal constituting one of the electrodes, in combination with a tray or receptacle for such cases and having a plurality of stiff separating-partitions interspersed throughout the cells and arranged in contact with the side walls of the adjacent cases, and insulating material between the several individual cases, substantially as set forth.

In testimony whereof I have hereunto set my hand in presence of two subscribing witnesses.

ELMER A. SPERRY.

Witnesses:
W. S. ROGERS,
M. C. PRENDERGAST.